United States Patent
Nam et al.

(10) Patent No.: US 9,027,158 B2
(45) Date of Patent: May 5, 2015

(54) DOWNLOAD METHOD OF MEDIA CONTENTS

(75) Inventors: Hyoungki Nam, Seoul (KR); Hongil Kwon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 72 days.

(21) Appl. No.: 13/503,266

(22) PCT Filed: Oct. 18, 2010

(86) PCT No.: PCT/KR2010/007121
§ 371 (c)(1),
(2), (4) Date: Aug. 2, 2012

(87) PCT Pub. No.: WO2011/049336
PCT Pub. Date: Apr. 28, 2011

(65) Prior Publication Data
US 2012/0311726 A1 Dec. 6, 2012

(30) Foreign Application Priority Data
Oct. 20, 2009 (KR) .................. 10-2009-0099786

(51) Int. Cl.
*H04L 29/06* (2006.01)
*G06Q 30/06* (2012.01)

(52) U.S. Cl.
CPC .............. *G06Q 30/06* (2013.01); *H04L 63/083* (2013.01)

(58) Field of Classification Search
CPC .................................................... H04L 63/083
USPC .......................... 726/26, 29; 705/52; 713/189
See application file for complete search history.

(56) References Cited

U.S. PATENT DOCUMENTS

| | | | | |
|---|---|---|---|---|
| 7,290,285 | B2* | 10/2007 | McCurdy et al. | 726/27 |
| 7,421,411 | B2* | 9/2008 | Kontio et al. | 705/52 |
| 2008/0127351 | A1* | 5/2008 | Jang et al. | 726/26 |
| 2008/0250239 | A1* | 10/2008 | Risan et al. | 713/153 |
| 2009/0037385 | A1 | 2/2009 | Min et al. | |
| 2010/0185872 | A1* | 7/2010 | Poo et al. | 713/189 |

FOREIGN PATENT DOCUMENTS

| | | |
|---|---|---|
| CN | 101282326 A | 10/2008 |
| JP | 2008-543216 A | 11/2008 |
| KR | 10-1998-0050393 A | 9/1998 |
| KR | 2001-0106325 A | 11/2001 |
| KR | 10-2007-0034384 A | 3/2007 |
| KR | 10-2009-0013325 A | 2/2009 |

* cited by examiner

*Primary Examiner* — Longbit Chai
(74) *Attorney, Agent, or Firm* — Birch, Stewart, Kolasch & Birch, LLP

(57) ABSTRACT

A download method of media contents, and which includes receiving and storing, by an electronic book terminal, a DRM (Digital Right Management) code from a contents server, the DRM code being stored in a memory of the electronic book terminal; receiving a media contents list from the contents server by requesting the media contents list at the contents server; decoding the received media contents list with the DRM code stored in the memory; displaying the media contents list on a screen of the electronic book terminal; requesting at least one media contents at the contents server, the at least one media contents being selected in the media contents list in response to a user input; receiving the at least one media contents from the contents server; and decoding the received at least one media contents with the DRM code stored in the memory.

4 Claims, 4 Drawing Sheets

DOWNLOAD METHOD OF MEDIA CONTENTS

FIELD OF THE INVENTION

The present invention relates to a download method of media contents configured to allow an electronic book terminal to download various media contents such as books, newspapers, magazines, weeklies and monthlies.

DISCUSSION OF THE RELATED ART

In a case media contents such as books, newspapers, magazines, weeklies and monthlies are manufactured by media contents capable of providing through Internet, a manufacturing cost becomes reasonable, and sales can be promptly implemented through Internet upon editing. Furthermore, the media contents capable of providing through Internet have advantages of no burden of distribution and stock, and of fast planning and publishing catering to the trend of the times. Books, newpapers, magazines, weeklies and monthlies that have a small marketing scale can be easily published by media contents.

Furthermore, a user can perform text search through the media contents and utilize various functions by being connected to the Internet, and once the media contents are manufactured, the manufactured media contents can be perpetually marketed, thereby replacing paper-printed media at a fast pace to cope with an increase of population using the Internet and expansion of optical communication network.

In a case a predetermined media contents are downloaded through Internet, according to a conventional manner, an electronic book terminal used to be connected to a contents server in response to a user manipulation, and download was implemented after search of desired media contents.

However, the media contents such as newpapers, magazines, weeklies and monthlies that are published on a daily, weekly or monthly basis suffer from disadvantages in that a user must remember a publishing date, and connect to a contents server on the memorized publishing date to download the media contents. Another disadvantage is that the media contents can be used not only for a downloading electronic book terminal but also by any arbitrary electronic book terminal, failing to protect the media contents.

SUMMARY OF THE INVENTION

The present invention is directed to a download method of media contents configured to provide an intrinsic DRM (Digital Right Managment) code to each electronic book terminal, whereby media contents that have been downloaded only through the provided DRM code can be viewed.

The present invention is directed to a download method of media contents configured to allow periodically-published media contents to pre-store time information to be downloaded by an electronic book terminal, and to allow the electronic book terminal to download relevant media contents from contents server in response to the pre-stored time information.

The present invention is directed to a download method of media contents configured to allow a user to be aware of and to check media contents being downloaded, in a case an electronic book terminal has downloaded periodically-published media contents.

Technical problems to be solved by the present invention are not restricted to the above-mentioned, and any other technical problems not mentioned so far will be clearly appreciated from the following description by those of ordinary skill in the art.

An object of the invention is to solve at least one or more of the above problems and/or disadvantages in a whole or in part and to provide at least the advantages described hereinafter. In order to achieve at least the above objects, in whole or in part, and in accordance with the purposes of the disclosure, as embodied and broadly described, there is provided a download method of media contents in one general aspect of the present invention, the method characterized by: connecting to and registering with a contents server, and downloading a DRM (Digital Right Management) code generated by the contents server, by an electronic book terminal; requesting, by the electronic book terminal, a media contents list from the contents server to download a media contents list encoded by the DRM code; decoding and displaying on a screen, by the electronic book terminal, the downloaded media contents list in response to the DRM code; and requesting, by the electronic book terminal, the media contents selected from the media contents list displayed on the screen from the contents server to download relevant media contents encoded in response to the DMR code.

In some exemplary embodiments of the present invention, the step of downloading and storing the DRM code may be characterized by: receiving, by the electronic book terminal, an ID (IDentification) and a password in response to a connection command from the contents server, and combining the received ID and password with information on the electronic book termial to generate a message and transmit the generated message to the contents server; receiving and storing, by the contents server, the message and registering the electronic book terminal; generating, by the contents server, the DRM code using the message to store the generated DRM code in response to the message and to transmit the message to the electronic book terminal; and receiving, by the electronic book terminal, the DRM code transmitted by the contents server and storing the code.

In some exemplary embodiments of the present invention, the information on the electronic book terminal may be characterized by at least one of a serial number of the electronic book terminal and information on a communication network in which the electronic book terminal communicates with an outside.

In some exemplary embodiments of the present invention, the information on the communication network may be characterized by at least one or more from an ESN (Electronic Serial Number), an IMEI (International Mobile Equipment Identity) and an MAC (Media Access Control) address.

In some exemplary embodiments of the present invention, the step of downloading the encoded media contents list may be characterized by: determining, by the contents server, whether the electronic book terminal is a registered electronic book terminal; and encoding the media contents list in response to a relevant DRM code and transmitting the encoded media contents list to the electronic book terminal if it is determined as a result of the determation that the electronic book terminal is a registered electronic book terminal.

In some exemplary embodiments of the present invention, the download method of media contents may be characterized by, following the downloading the media contents, decoding, by the electronic book terminal, the downloaded media contents according to the DRM code, if an execution command is inputted; and displaying the decoded media contents on the screen.

In another general aspect of the present invention, there is provided a download method of media contents, the method characterized by: transmitting a message to and registering with a contents server, and downloading a DRM (Digital Right Management) code generated by the contents server to store it, by an electronic book terminal; connecting, by the electronic book terminal, to the contents server to set up a periodic subscription to the media contents; setting up, by the electronic book terminal, time information to download the media contents set up for the periodic subscription; and requesting, by the electronic book terminal, the media contents of the contents server to download the media contents from the contents server if a time based on the set-up downloaded time information arrives.

In some exemplary embodiments of the present invention, the step of downloading and storing the DRM code may be characterized by: receiving, by the electronic book terminal, an ID (IDentification) and a password in response to a connection command from the contents server, and combining the received ID and password with information on the electronic book termial to generate a message and transmit the generated message to the contents server; receiving and storing, by the contents server, the message and registering the electronic book terminal; generating, by the contents server, the DRM code using the message to store the generated DRM code in response to the message and to transmit the message to the electronic book terminal; and receiving, by the electronic book terminal, the DRM code transmitted by the contents server and storing the code.

In some exemplary embodiments of the present invention, the information on the electronic book terminal may be characterized by at least one of a serial number of the electronic book terminal and information on a communication network in which a communication is performed with an outside.

In some exemplary embodiments of the present invention, the information on the communication network may be characterized by at least one or more from an ESN (Electronic Serial Number), an IMEI (International Mobile Equipment Identity) and an MAC (Media Access Control) address.

In some exemplary embodiments of the present invention, the step of setting up the media contents subscription may be characterized by: connecting, by the electronic book terminal, to the contents server to transmit the message; receiving, by the contents server, the message to determine whether the electronic book terminal is the registered electronic book terminal; receiving, by the contents server, the periodic subscription information of periodically published media contents transmitted by the electronic book terminal to register the periodic subscription if it is determined as a result of the determination that the electronic book terminal is the registered electronic book terminal.

In some exemplary embodiments of the present invention, the method may be characterized in that the time information for downloading the media contents includes a date and time information for downloading the media contents.

In some exemplary embodiments of the present invention, the method may be characterized by: setting up a notifying time for notifying a user of the download of the media contents and information on a mobile communication terminal; and transmitting a SMS (Short Message Service) notifying the download of the media contents to the mobile communication terminal if the notifying time has arrived, after downloading the media contents.

In some exemplary embodiments of the present invention, the download method of media contents may be characterized by, following the transmission of the SMS message, decoding, by the electronic book terminal, the downloaded media contents according to the DRM code, if an execution command is inputted; and displaying the decoded media contents on the screen.

In some exemplary embodiments of the present invention, the method may be characterized by transmitting a message notifying, by the electronic book terminal, to the contents server that the download of the media contents has been completed if the download of the media contents is completed.

There is an advantageous effect in the download method of media contents according to the present invention in that the media contents can be viewed only if each of the electronic book terminals is provided with an intrinsic DRM code, and the media contents downloaded from the contents server are decoded in response to the DRM code. Therefore, the media contents provided by the contents server cannot be viewed by other terminals than a designated electronic book terminal to prevent the media contents from being unlawfully dispersed.

Furthermore, time information for downloading the periodically published media contents is pre-stored in the electronic book terminal, and the electronic book terminal is connected to the contents server in response to the stored time information to download the media contents, such that there is an advantageous effect that a user is free from personally downloading the periodically published media contents.

BRIEF DESCRIPTION OF THE DRAWINGS

Non-limiting exemplary embodiments of the present invention will be described in detail with reference to the accompanying drawings. Like reference numerals refer to like parts or portions throughout the description of several views of the drawings.

DETAILED DESCRIPTION OF THE INVENTION

The advantages, features and methods for achieving the foregoing will be apparent from the accompanying drawings and exemplary embodiments that follow.

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

This invention may be embodied in various forms and should not be construed as limited to the embodiments set forth herein. Rather, these embodiments are provided so that this disclosure will be thorough and complete, and will fully convey the scope of the invention to those skilled in the art.

Figure 1:
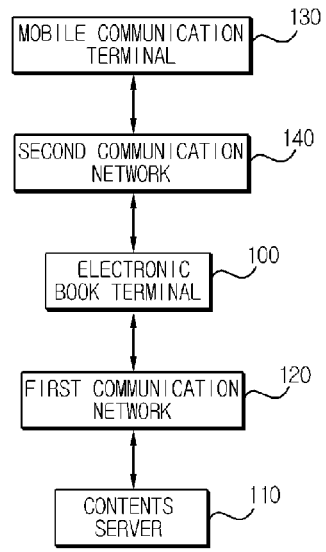
FIG. 1 is an exemplary configuration of a system applied with a downloading method according to the present invention.

FIG. 1 is an exemplary configuration of a system applied with a downloading method according to the present invention, where reference numeral 100 is an electronic book terminal.

The electronic book terminal (100) serves to execute a predetermined media contents in response to a user manipulation. For example, the electronic book terminal (100) may execute media contents such as a predtermined book, newspaper, magazine, weekly and monthly selected by the user and display on a screen whereby the user can read. Furthermore, the electronic book terminal (100) may request the download of a predetermined media contents set up by the user for a periodic subscription at a preset time, and receive the media contents provided by the request.

Reference numeral 110 is a contents server, the contents server (110) may store a predetermined media contents and transmit to the electronic book terminal (100) the predetemined media contents which is requested to download by the electronic book terminal (100). Furthermore, the contents server (110) may provide an intrinsic DRM (Digital Right Management) code to each electronic book terminal (100).

Reference numeral 120 is a first communication network. The first communication network (120) may be, for example, an Internet where the electronic book terminal (100) and the contents server (110) are connected to the first communication network (120) to transmit a predetermined date therebetween.

Reference numeral 130 is a mobile communication terminal. The mobile communication terminal (130) may receive a message notifying the download of the media contents transmitted by the electronic book terminal (100) in a SMS (Short Message Service). Reference numeral 140 is a second communication network. The second communication network (140) may be, for example, a mobile communication network, where the contents server (110) and the mobile communication terminal (130) transmit to each other a message such as the SMS through the second communication network (120).

The download method applied to the abovementioned system according to the present invention is such that the electronic book terminal must be first registered with the contents server and the DRM code must be downloaded and stored.

Figure 2:
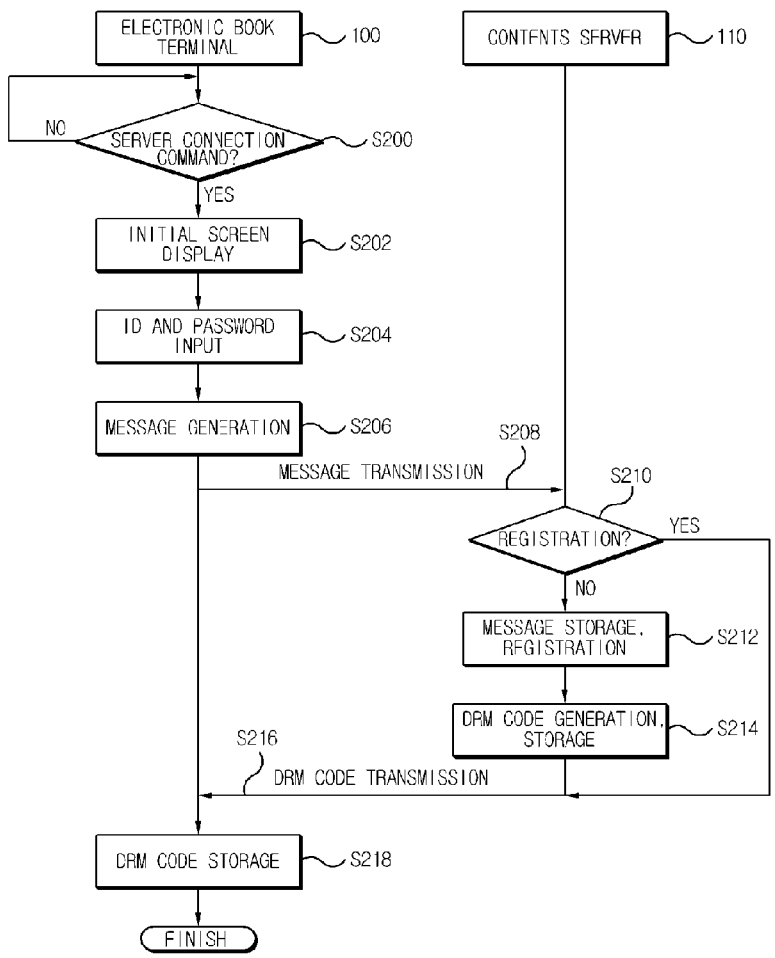
FIG. 2 is an exemplary operation in which an electronic book terminal is registered on a contents server to download a DRM code in a download method of media contents according to an exemplary embodiment of the present invention.

FIG. 2 is an exemplary operation in which an electronic book terminal is registered on a contents server to download a DRM code in a download method of media contents according to an exemplary embodiment of the present invention.

Referring to FIG. 2, the electronic book terminal (100) may determine whether a command has been inputted from a user interface (UI, not shown) to connect to the contents server (110) (S200). It it is determined that the command has been inputted to connect to the contents server (110), the electronic book terminal (100) may display an initial screen capable of inputting an ID (IDentification) and a password (S202), and the ID and the password are inputted from the UI (S204).

If the ID and the password are inputted, the electronic book terminal (100) may combine information of the electronic book terminal (100) with the ID and the password to generate a message (S206). For example, the electronic book terminal (100) may combine information of a communication network including at least one of a serial number, an ESN (Electronic Serial Number), an IMEI (International Mobile Equipment Identity) and an MAC (Media Access Control) address with the ID and the password to generate a message.

If the message is generated, the electronic book terminal (100) may be connected to the contents server (110) through the first communication network (120) and transmit the generated message to the contents server (110) (S208). If the message is received from the electronic book terminal (100), the contents server (110) may determine whether the electronic book terminal (100) is registered using the received message (S210).

As a result of the determination, if the electronic book terminal (100) is not registered, the contents server (110) may store the message received from the electronic book terminal (100) and register (S212), use the received message to generate the DRM code, and store the generated DRM code responsive to the message (S214).

The contents server (110) may transmit the generated DRM code to the electronic book terminal (100) through the first communication network (120) (S216). Successively, the electronic book terminal (100) may receive and store the DRM code (S218), where the DRM code is generated by using the message received by the contents server (110), and each of the electronic book terminal (100) is provided with an intrinsic DRM code.

Figure 3:
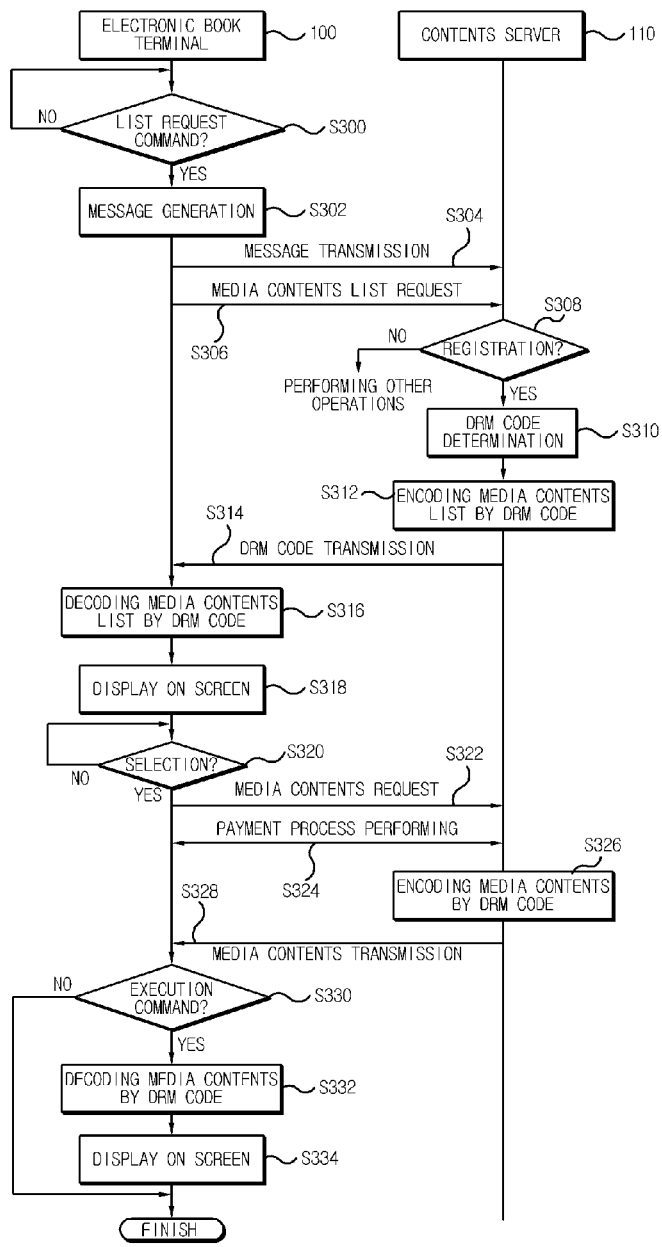
FIG. 3 is an exemplary operation in which an electronic book terminal downloads a predetermined media contents from a contents server and decodes the downloaded media contents with DRM code for displaying on a screen according to the present invention.

FIG. 3 is an exemplary operation in which an electronic book terminal downloads a predetermined media contents from a contents server and decodes the downloaded media contents with DRM code for displaying on a screen according to the present invention.

Referring to FIG. 3, the electronic book terminal (100) may determine whether a command requesting a media contents list has been inputted from the UI (S300).

As a result of the determination, if the command requesting the media contents list has been inputted, the electronic book terminal (100) may generate a message notifying itself (S302), and may transmit the generated message to the contents server (110) (S304). That is, the electronic book terminal (100) may display an initial screen to receive the ID and the password from the UI, may combine the inputted ID and the password with the information of the electronic book terminal (100) to generate a pre-determined message and to transmit the generated message to the contents server (110).

The electronic book terminal (100) may request the media contents list of the contents server (110) (S306). The contents server (110) may use the message received from the electronic book terminal (100) to determine whether the electronic book terminal (100) is a registered electronic book terminal (100) (S308).

As a result of the determination, in case of registered electronic book terminal (100), the contents server (110) may determine the DRM code provided to a relevant electronic book terminal (100) (S310), encode the media contents list by the DRM code (S312), and transmit the DRM code to the electronic book terminal (100) (S314).

The electronic book terminal (100) may receive the media contents list transmitted by the contents server (110) to decode the list in response to the DRM code (S316), and display the media contents list on the screen to allow the user to check the media contents list (S318). Under this circumstance, the electronic book terminal (100) may determine whether a command for selecting a predetermined media contents has been inputted from the UI (S320).

As a result of the determination, if the command for selecting the predetermined media contents has been inputted, the electronic book terminal (100) may request purchase of relevant media contents of the contents server (110) (S322) and pay an amount for purchase of the media contents by executing a payment process (S324). At this time, the payment process is the conventional payment method, a detailed process of which is omitted.

In a case the payment process is completed, the contents server (110) may encode a relevent media contents in response to a relevant DRM code of the electronic book terminal (100) (S326), and transmit the encoded media contents to the electronic book terminal (100) (S328). The electronic book terminal (100) may download the media contents transmitted by the contents server (110) and determine whether an execution command for the downloaded media contents has been inputted (S330).

As a result of the determination, if the execution command has been inputted, the electronic book terminal (100) may decode the downloaded media contents using the DRM code (S332) and display the decoded media contents for the user to view (S334).

DETAILED DESCRIPTION OF THE INVENTION

Figure 4:
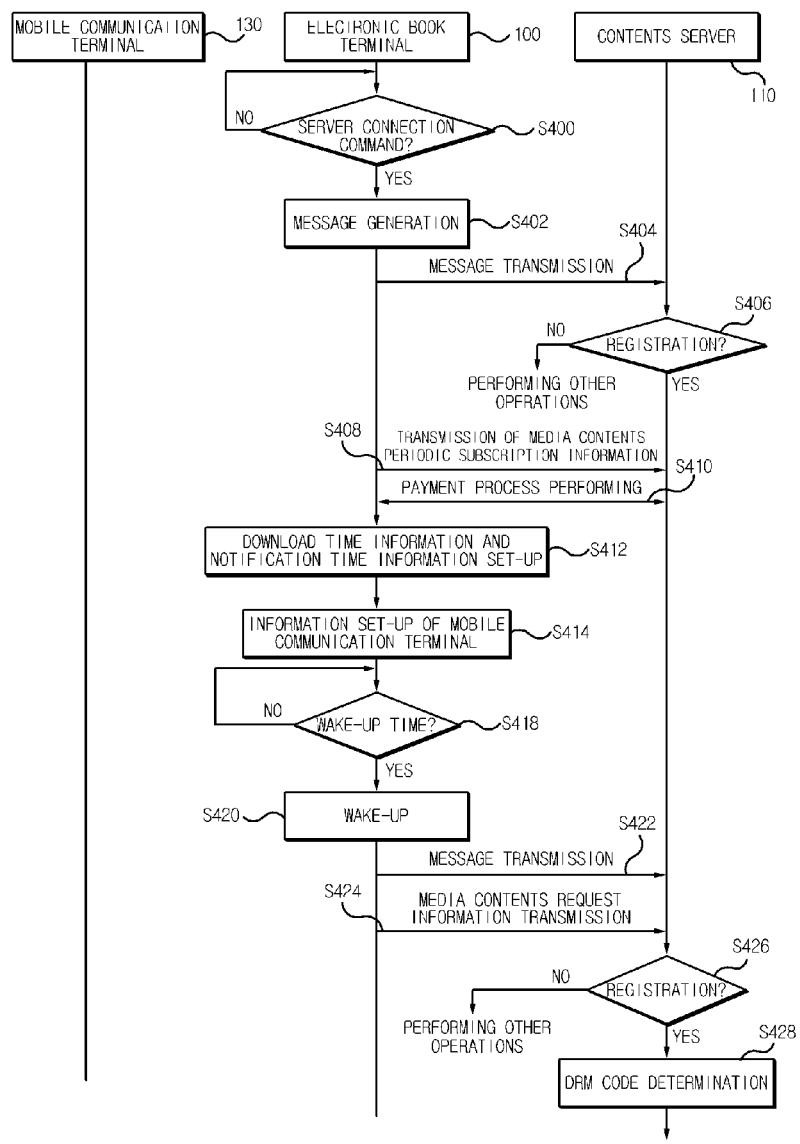
FIGS. 4 and 5 are exemplary operation in which a periodic subscription of media contents published on a periodic base is set up and downloaded in a download method of media contents according to the present invention.
Figure 5:
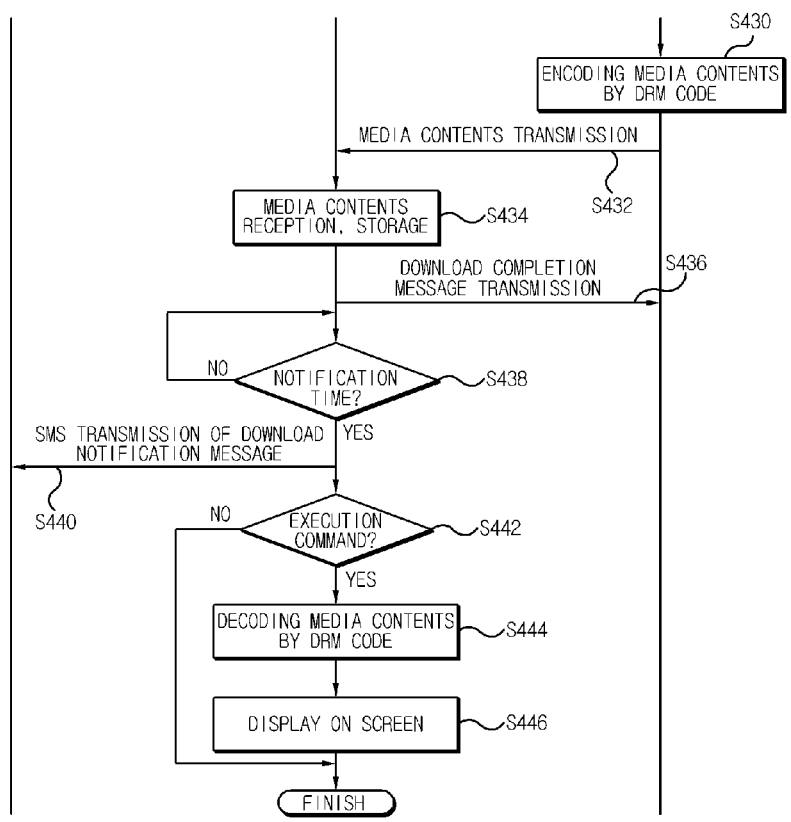

FIGS. 4 and 5 are exemplary operation in which a periodic subscription of media contents published on a periodic base is set up and downloaded in a download method of media contents according to the present invention.

Referring to FIG. 4, the electronic book terminal (100) may determine whether a command to connect to the contents server (110) has been inputted from the UI (S400). As a result of the determination, if the command has been inputted, the electronic book terminal (100) may generate self-notifying message (S402) and transmit the generated message to the contents server (110) (S404). Successively, the contents server (110) may detemine using the message received from the electronic book terminal (100) whether the electronic book terminal (100) is the registered electronic book terminal (100) (S406).

Under the state where the electronic book terminal (100) is registered with the contents server (110), the electronic book terminal (100) may transmit to the contents server (110) subscription setup information capable of periodically subscribing to a predetermined media contents that is periodically published including newspaper, a magazine, a weekly and a monthly, and set up a periodic subscription to the pre-detemined media contents (S408).

Furthermore, the electronic book terminal (100) and the contents server (110) may perform a payment process to each other to pay the amount of media contents configured to set up the periodic subscription (S410).

In a case the payment process is completed, the electronic book terminal (100) may set up time information configured to download the media contents set up for the periodic subscription, and a notification time information notifying the user that the media contents have been downloaded, in response to an operation command inputted from the UI (S412). For example, the download time information including a date and a time to download the media contents, and the notification time notifying the user of the download of the media contents may be set up.

Furthermore, the electronic book terminal (100) may register the information of a mobile communication terminal (130) that notifies the user of the download of the media contents (S414), and set up a wake-up time configurd to wake up itself for downloading of the media contents (S416). At this time, the wake-up time may not be separately set up but be set up by time information configured to download the media contents.

Under this circumstance, the electronic book terminal (100) may determine whether time has matured for set-up wake up time (S418). As a result of the determination, if the time has matured, the electronic book terminal (100) may be woken up (S420), and connected to the contents server (110) through the first communication network (120) to transmit a message for notifying self information (S422) and to request download of media contents that is set up for periodic subscription (S424).

Successively, the contents server (110) may determine whether the electronic book terminal (100) is an electronic book terminal (100) registered by the message received from the electronic book terminal (100) and whether the media contents set up for periodic subscription has been registered (S426).

As a result of the determination, if the electronic book terminal is the registered electronic book terminal (100), and if the media contents set up for periodic subcription has been registered, the contents server (110) may detemine a relevant DRM code provided to the electronic book terminal (100) (S428).

In the case that the DRM code is determined, as illustrated in FIG. 5, the contents server (110) may encode the media contents set up for the periodic subscription using the DRM code (S430) and transmit the encoded media contents to the electronic book terminal (100) (S432).

The electronic book terminal (100) may receive and store the media contents transmitted by the contents server (110) (S434), and transmit a message to the contents server (110) notifying that the download of the media contents have been completed in a case the media contents have been completed in downloading (S436). Successively, the electronic book terminal (100) may determine whether time has matured for the set-up notification time (S438).

As a result of the determination, if the set-up notification time has arrived, the electronic book terminal (100) may transmit to the mobile communication terminal (130) a message by SMS, notifying that the download of the media contents have been completed (S440). Furthermore, the electronic book terminal (100) may determine whether an execution command has been inputted from the UI (S442), decode the downloaded media contents by the DRM code in a case the execution command has been inputted (S444), and display the decoded media contents on the screen to allow the user to check the media contents (S446).

The download method of media contents according to the present invention has an industrial applicability in that information configured to download media contents such as newspaper, a magazine, a weekly and a monthly is pre-stored, and relevant media contents are requested and downloaded at a date and a time based on the downloaded information, whereby the user is free from personally downloading the media contents.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. A download method of media contents, the method comprising:
   receiving and storing, by an electronic book terminal, a digital right management (DRM) code from a contents server, the DRM code being stored in a memory of the electronic book terminal;
   receiving a media contents list from the contents server by requesting the media contents list at the contents server;
   decoding the received media contents list with the DRM code stored in the memory;

displaying the media contents list on a screen of the electronic book terminal;
requesting at least one media contents at the contents server, the at least one media contents being selected in the media contents list in response to a user input;
receiving the at least one media contents from the contents server; and
decoding the received at least one media contents with the DRM code stored in the memory,
wherein the receiving and storing comprises:
   receiving an identification (ID) and a password through a user input unit of the electronic book terminal from a user;
   generating a message associated with the ID, the password and information on the electronic book terminal;
   transmitting the message to the contents server;
   receiving the DRM code from the contents server, the DRM code corresponding to the message and having been stored in the contents server; and
   storing the DRM code in the memory, and wherein receiving the media contents list from the contents server comprises:
   determining, by the contents server, whether the electronic book terminal is registered;
   encoding, by the contents server, the media contents list with the DRM code stored in the contents server; and
   transmitting, by the contents server, the encoded media contents list when it is determined that the electronic book terminal is registered.

2. The method of claim 1, wherein the information on the electronic book terminal includes at least one of a serial number of the electronic book terminal and information on a communication network in which the electronic book terminal communicates with an outside.

3. The method of claim 2, wherein the information on the communication network includes at least one of an electronic serial number (ESN), an international mobile equipment identity (IMEI), and a media access control (MAC) address.

4. The method of claim 1, further comprising:
displaying the decoded at least one media contents on the screen of the electronic book terminal.

\* \* \* \* \*